United States Patent
Braz et al.

(10) Patent No.: US 8,619,839 B2
(45) Date of Patent: Dec. 31, 2013

(54) INTERFACE MODULE FOR A UNIT OF AN ANTENNA DISTRIBUTION SYSTEM, AND ANTENNA DISTRIBUTION SYSTEM

(75) Inventors: Oliver Braz, Monheim (DE); Jorg Stefanik, Donauworth (DE); Jaroslav Hoffmann, Donauworth (DE)

(73) Assignee: Andrew Wireless Systems GmbH, Hickory, NC (US)

( * ) Notice: Subject to any disclaimer, the term of this patent is extended or adjusted under 35 U.S.C. 154(b) by 223 days.

(21) Appl. No.: 13/094,486

(22) Filed: Apr. 26, 2011

(65) Prior Publication Data
US 2011/0274145 A1 Nov. 10, 2011

(30) Foreign Application Priority Data
Apr. 27, 2010 (DE) .......................... 10 2010 018 492

(51) Int. Cl.
*H04B 3/36* (2006.01)
(52) U.S. Cl.
USPC ............ 375/211; 375/213; 375/214; 375/285; 375/311; 375/373; 375/141; 375/219; 375/239; 375/346; 375/347
(58) Field of Classification Search
USPC ......... 375/211, 213, 214, 285, 311, 373, 141, 375/219, 239, 343, 346, 347; 370/219, 293, 370/315, 396; 455/7
See application file for complete search history.

(56) References Cited

U.S. PATENT DOCUMENTS

| | | | |
|---|---|---|---|
| 5,852,651 A | 12/1998 | Fischer et al. | |
| 6,937,878 B2 | 8/2005 | Kim et al. | |
| 7,034,678 B2 | 4/2006 | Burkley et al. | |
| 7,355,993 B2 * | 4/2008 | Adkins et al. | 370/318 |
| 7,643,791 B2 | 1/2010 | Masoian | |
| 7,697,929 B2 | 4/2010 | DiPiazza | |
| 2006/0119603 A1 * | 6/2006 | Chen et al. | 345/502 |
| 2007/0155314 A1 * | 7/2007 | Mohebbi | 455/11.1 |
| 2009/0046624 A1 | 2/2009 | Martinez et al. | |

FOREIGN PATENT DOCUMENTS

| | | |
|---|---|---|
| EP | 1995968 A2 | 11/2008 |
| GB | 2418803 A | 4/2006 |
| WO | 2010003526 A1 | 1/2010 |

* cited by examiner

*Primary Examiner* — Dhaval Patel
(74) *Attorney, Agent, or Firm* — Wood, Herron & Evans, LLP (57) ABSTRACT

An interface module (4) for a unit (1, 2) which is designed to transmit and/or amplify essential communication signals inside an antenna distribution system (29) is specified, said module comprising a first analog interface (6) for forwarding and receiving essential communication signals from mobile terminals (32), a second interface (7) for forwarding and receiving essential communication signals from the antenna distribution system (29), at least one signal path (9, 10) for forwarding the received communication signals between the two interfaces (6, 7), and a controllable digital unit (11) which incorporates the signal path (9, 10) and has means for digitizing incoming communication signals and for subjecting outgoing communication signals to analog conversion. In this case, the digital unit (11) is designed to identify essential communication signals in the digitized communication signals, to mask the remaining signals and to forward the essential communication signals. An antenna distribution system (29) having at least one master unit (2) and a number of remote units (1) which are connected to the latter and are equipped with such an interface module (4) is also specified. The invention makes it possible to use the advantages of a modern radio network architecture to communicate on essential communication channels.

16 Claims, 2 Drawing Sheets

INTERFACE MODULE FOR A UNIT OF AN ANTENNA DISTRIBUTION SYSTEM, AND ANTENNA DISTRIBUTION SYSTEM

RELATED APPLICATIONS

This application claims priority to German Patent Application No. DE 10 2010 018 492.6 entitled "Interface Module for Unit of an Antenna Distribution System, and Antenna Distribution System", filed on Apr. 27, 2010, which application is incorporated herein by reference in its entirety.

FIELD OF THE INVENTION

The invention relates to an interface module for a unit which is designed to transmit and/or amplify communication signals inside an antenna distribution system. The invention also relates to an antenna distribution system having at least one master unit and a number of remote units which are connected to the master unit.

BACKGROUND OF THE INVENTION

In this case, the invention deals with the problem of ensuring adequate radio communication on so-called essential, non-public communication channels which are enabled for train radio or commercial radio, the disaster control action forces, the rescue service action forces, the police, fire brigades, emergency doctors and other ancillary workers and must not be used for public radio communication. It also deals with the entire operational mobile radio of applications with particular security tasks in industry, local public transport, authorities, airports and the military.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention. It should be understood that the appended drawings are not necessarily to scale, presenting a somewhat simplified representation of various features illustrative of the basic principles of the invention.

DETAILED DESCRIPTION OF EMBODIMENTS OF THE INVENTION

Amplitude modulation is generally used to transmit information on the essential communication channels in the VHF range; frequency modulation is optionally used. Phase modulation (π/4-DQPSK, π/8-D8PSK or CQPSK) and quadrature amplitude modulation (4-QAM, 16-QAM or 64-QAM) are also used in more modern digital trunked radio systems (e.g. Terrestrial Trunked Radio TETRA, TETRAPOL, P25). Only a narrow channel bandwidth is required on account of the small modulation swing and the low transmission rates. The simplex, duplex or semi-duplex operating modes are used for bidirectional communication. Only one band of the essential communication signal is used in the simplex mode. Information is interchanged alternately and with a time delay. A defined lower band and a defined upper band are alternately used in the duplex mode. Alternate communication can take place at the same time. In this case, so-called relay stations are used to set up communication. In this case, mobile units and fixed stations transmit in the lower band and receive in the upper band. The relay stations themselves which increase the range receive the calls in the lower band and retransmit them in the upper band. The calls are therefore separated between an uplink direction (towards a base station) and a downlink direction (towards a mobile terminal) by means of frequency separation.

During a disaster situation, a rescue operation or in the case of accidents in the air, in the water or on land, there is a need for rapid and undisturbed communication between all action forces involved as far as possible. Radio communication between the action forces which is required at the location is already restricted by virtue of the fact that different units, for example fire brigade, police and disaster control, interchange information on different communication channels using different transmission methods. In addition, the communication technologies and transmission frequencies provided for emergencies are not optimized for the technical possibilities of contemporary modern mobile radio networks. It is true that the action forces can communicate with one another in situ over relatively long distances at the frequencies of the essential communication signals of below 700 MHz which are enabled for emergencies. However, the repeater technology possibly present for modern mobile radio networks inside closed buildings, vehicles or tunnels cannot be optimally used to transmit the essential communication signals on account of the long wavelengths and on account of the relatively simple radio transmission methods provided for emergencies. Modern mobile radio networks communicate in the gigahertz range. Complex modulation methods are used to code the signals. In addition to frequency separation, the time-division duplexing (TDD) method, in particular, is used to separate uplink and downlink communication, but the time constants are orders of magnitude smaller than those used in the simplex mode inside an essential communication channel.

Whereas, on the one hand, the transmission of essential communication channels imposes low demands on the bandwidth, a very large dynamic range must be ensured and a high degree of isolation between uplink and downlink communication must be implemented, on the other hand. On account of the long wavelengths of essential communication signals, separation from one another and isolation between the uplink and downlink directions with the aid of channel-selective analog filters require a considerable amount of technical effort which is sometimes associated with huge costs.

Considerations relating to how adequate communication can be ensured on essential communication channels between action forces from different units or using a modern network architecture to transmit information by means of radio are known, for example, from US 2004/0070515 A1, US 2005/0260983 A1 or US 2008/01711527 A1. The transmission of sampled radio-frequency signals in distributed antenna systems is known, for example, from U.S. Pat. No. 5,852,651.

The object of the invention is to provide a technical solution which enables adequate communication between action forces on essential communication channels using a modern radio network architecture. In this case, the advantages known from a modern radio network architecture are also intended to be provided for communication on essential communication channels.

The stated object is achieved, according to the invention, by an interface module for a unit which is designed to transmit and/or amplify communication signals inside an antenna distribution system, the interface module comprising a first analog interface for forwarding and receiving communication signals from mobile terminals, a second interface for forwarding communication signals from the antenna distribution system in a digital or analog manner and for receiving said signals, at least one signal path for forwarding the received communication signals between the two interfaces, and a controllable digital unit which incorporates the signal path and has means for digitizing incoming communication signals and for subjecting outgoing communication signals to analog conversion. In this case, the digital unit is designed to identify essential communication signals in the digitized communication signals, to mask the remaining signals and to forward the selected essential communication signals.

In this case, essential communication signals between different remote units, an optionally connected base station or an optionally connected further network are controlled and/or converted by means of a central interface module in the master unit. In this case, it should be stated that interchange between individual branches of the distribution network is envisaged only in digital form. In this sense, a remote unit and a master unit are units of the antenna distribution system.

In other words, the invention provides an interface module for equipping one or more remote units and a master unit, as are known for a modern antenna distribution system of a mobile radio network. Such a remote unit or a plurality of such remote units is/are used to ensure adequate communication with mobile terminals via radio, in particular in a radio shadow, inside closed buildings, in tunnels, in trains, in stations, in stadiums etc. In this case, a master unit connected to a base station of the respective radio network is located in the vicinity of the tunnel, the building or generally the locality in shadow and transmits communication signals between the base station and the remote units which are arranged inside the building or generally in the radio shadow. The remote units transmit the communication signals received, if appropriate in amplified form, and receive communication signals from mobile terminals, which signals are finally supplied in the uplink direction to the base station via the master unit. The remote units are usually also referred to as relay stations. This radio network architecture has the advantage that it is possible to centrally control the remote units via the master unit. The master unit and the base station may be connected in a wired or wireless manner. The remote units themselves are coupled to the master unit in a wired or optical manner, for example. However, the remote units may also be advantageously in the form of so-called off-air repeaters which are connected to the master unit via radio. The radio network architecture described also comprises a plurality of master units which are for their part in turn connected to a multiplicity of remote units. It is pointed out that a so-called "direct mode", that is to say a direct connection between two mobile terminals, is not possible in public mobile radio networks.

The invention is now based, in particular, on the consideration of using a remote unit to transmit and incorporate essential communication signals in the given mobile radio network. In particular, the intention is also to allow bidirectional communication on essential communication channels via one or more remote units using the given technology. The master unit or each master unit is likewise intended to be designed to receive, forward and distribute the essential communication signals in an appropriate manner.

In this case, the invention proposes an interface module, in which case the intention is to largely dispense with analog separation means such as duplexers or analog filters in order to separate the essential communication signals from one another and to adequately isolate the uplink and downlink directions from one another. On account of the long wavelengths of the essential communication signals, such a refinement for separating the narrowband channels requires an enormous amount of space and is additionally associated with high costs. Rather, the invention goes down the road of implementing a digital unit in the transmission or signal path of the antenna distribution system for communicating with a mobile terminal, which digital unit first of all digitizes the incoming signals in order to then demodulate them into baseband. This is achieved by providing an appropriately equipped interface module.

In this case, a high dynamic response which is required for the essential communication signals can be achieved, in particular, by means of narrowband digital oversampling with subsequent digital down conversion. It should be stated that there is no need to decrypt the usually encrypted baseband data in the case of digital modulation. The time delay or time requirement associated with this scheme, which is known as "decode and forward", cannot be tolerated in conventional mobile radio networks but plays only a subordinate role in the communication signals of the essential services, which communication signals are usually alternately operated. In this respect, sufficient time for adequately scanning the incoming communication signals and for corresponding identification at the digital level and for separating the remaining communication signals which are not required for the essential interface module remains for the digital unit within the given communication sequence. In particular, the digital unit can identify the frequencies, the type of modulation of the transmission signals and the transmission method used and can thus distinguish essential communication signals from one another and from the remaining communication signals. In one preferred refinement, the digital unit in one or more remote units is instructed to select, forward or convert to another band or another frequency via a central master unit.

The interface module is designed, in particular, in such a manner that it ensures the information interchange of the essential communication signals in a manner detached from the remaining communication signals of the mobile radio network. In this respect, it is preferably thought of as an additional module of an existing remote unit, but it is possible to resort to its existing computer or software architecture, in particular. In this respect, the digital unit described here need not be in the form of a separate digital unit, in particular. Rather, it may be fully implemented by an already existing digital unit provided for transmitting the communication signals of the mobile radio network in a TDD or FDD architecture. The functions and properties required for the present invention can then be implemented by appropriately programming the given computer or processor architecture.

In the simplest case, the signal path of the interface module is provided by a signal line which connects the two interfaces to one another. Such a signal line would possibly be sufficient for a simplex mode of the uplink and downlink signals but does not provide adequate possibilities for concomitantly including further essential communication signals from other transmission methods such as duplex or semi-duplex. For this reason, the signal path is expediently divided into a plurality of separate signal paths for the uplink direction and a plurality of separate signal paths for the downlink direction. The two communication directions are then separated according to the two given signal lines by means of a time-division duplexing (TDD) or a frequency-division duplexing (FDD) method.

The proposed architecture of the interface module also makes it possible to transmit the essential communication signals received to the master unit or to one or more remote units, in particular also in coded form, with a frequency offset or processed further in another manner. A corresponding control computer connected to the remote unit or to the master unit is then able to identify the essential communication signals received from a specific remote unit and to instruct the forwarding and/or conversion in the same remote unit or in another remote unit. Furthermore, the master unit optionally has the possibility of injecting these signals into a fixed a network, for example. Conversely, the master unit in the downlink direction can pre-process the transmission of essential communication signals in a corresponding manner again and can specifically instruct the respective remote unit. The remote unit can also, in particular, identify the signals intended for it using addressing. The digital unit can be designed and enabled for the corresponding actions using appropriate control commands. In the uplink direction, it is preferred for the essential communication signal which has been separated off to be combined again with the other information to be transmitted, intermodulation effects being prevented by means of an adequate frequency offset of the separated signals. In this case, the connecting line between the master unit and the remote unit is in the form of a common signal line for transmitting the entire data interchange. In particular, an optical waveguide is provided for this purpose. An appropriately configured coaxial line or a two-wire line for electrical signals is also possible.

In another refinement which is not illustrated here, it is also conceivable to connect a plurality of "off-air repeaters" via a radio modem.

In a further preferred refinement, the digital unit is designed to detect characteristic signal parameters of the essential communication signals identified and to likewise forward said signal parameters via the signal path. The transmission of such signal parameters allows a user to determine, for example, what type of essential communication signals are interchanged, how often such communication takes place or else from which remote unit the transmitted essential communication signal originates. In particular, this allows the transmitting mobile terminal to be located by detecting and forwarding the received signal strength and/or a detected propagation time. The type of transmission method for the essential communication signal can also be identified and the digital unit can be adapted in an automated manner using the master unit, if necessary. The interface module is then designed to establish communication in the respective essential communication band using the corresponding transmission method. The digital unit is particularly preferably designed to change over between different transmission methods of the essential communication methods, in particular between a simplex method, a duplex method or a semi-duplex method.

In particular, when forwarding the characteristic signal parameters such as signal strength, rate, frequency band and/or transmission method or type of communication of the essential communication signals identified, a respective conversion of the corresponding communication signals to other essential communication channels may be induced, thus making it possible for the action forces from different units to communicate with one another. In this case, the interface module is preferably designed in such a manner that the digital unit enables conversion to different frequency bands and ensures transmission of the essential communication signals at different frequencies using different transmission methods.

In principle, digitization at a sufficient sampling rate in accordance with known sampling methods is possible. In this case, modulation or a digital coding method may also be used, in principle, to improve the transmission rate. However, for reasons of cost and on account of the principal purpose pursued here, it is not sufficient to design the digital unit to digitize the communication signals in the baseband.

The digital unit is advantageously designed to delay and/or interrupt the forwarding of the essential communication signals in the direction of the first analog interface in a controllable manner. The refinement particularly refers to the design of standing waves in buildings, train or road tunnels or stadiums, which occur, in particular, in the case of the long-wave communication signals of the essential communication channels. Such a situation is, in particular, a consequence of the interference which occurs in the overlapping region of the radiation radii of a plurality of remote units placed in such localities. In this case, the resultant spatial interference patterns depend greatly on the respective wavelength used. As a result of the possibility of delaying the downlink traffic of a remote unit for essential communication signals, it is now possible to actively intervene in the shape of the resultant interference pattern. This operation which is known as a single-frequency network makes it possible to reduce radio holes for mobile receivers by deliberately delaying the emission of a correspondingly located remote unit, for example. Since all remote units transmit in phase, destructive interference is avoided. Alternatively, a remote unit can also be muted in the downlink direction.

In a further preferred refinement, the digital unit is designed to interrupt the forwarding of the essential communication signals in the direction of the second interface in a controllable manner. In this case, reference is made, in particular, to the fact that, if there are a plurality of remote units, the transmitted essential communication signals have a better signal-to-noise ratio if the information with the weakest signal is not used overall to form the communication signal. In this respect and on the basis of signal strength detection, the master unit can mute that remote unit which has the weakest signal with respect to the receiving side in the uplink direction in an automated manner or in an externally controlled manner. This method which is known as "uplink muting" makes it possible to produce an overall better transmission quality for the essential communication signals.

In the opposite direction, the transmission of noise can be suppressed by means of a short-circuit switch in the DL path downstream of the amplifier if the latter is idling. This is very advantageous, in particular, in the semi-duplex mode during the uplink time or in the case of the direct mode in which there is no need for a relay on account of the level ratios.

In addition to this or in an independent manner, the digital unit of the interface module is preferably designed to feed the incoming essential communication signals back in the direction of the first analog interface. In other words, a remote unit is thereby designed for direct communication, in which case information or the essential communication signals identified is/are transmitted or not transmitted to the master unit or to one or more remote units in a controlled manner. The essential communication signals received are reflected to a certain extent at the digital unit and are again applied to the first analog radio transmission interface in amplified form and, if appropriate, with a time delay or frequency offset for transmission. This direct mode allows radio communication between the action forces to be improved in situ. In particular, the reception signal which has been "reflected back" can be modified by the digital unit in such a manner that it can also be received and processed by the mobile terminals belonging to the action forces from other units. In this case, the remote unit controlled in this manner acts, to a certain extent, as a relay station which improves the range and transmission strength of the essential communication signals between the mobile terminals and, in particular, between the mobile action forces from different units, with the result that the coordination possibilities in situ are considerably increased.

The digital unit is expediently designed for controllable frequency conversion between the frequency bands of essential communication signals. As already described above, this allows communication to be established between mobile terminals belonging to the action forces from different units. In this case, the digital unit is preferably additionally also designed to take into account the respectively used transmission method of the corresponding essential communication channels.

In order to allow central forwarding, control and monitoring of information interchange, the interface module includes a communication unit. In this case, a central control computer which is connected to the master unit, for example, is responsible for central control. This communication unit may be an integrated part of the digital unit. However, if a digital unit which is already implemented in an existing remote unit is used, for example, to perform the functions described above, it is advisable to provide a separate communication unit in the interface module, which communication unit ensures or controls data interchange between the master unit and the digital unit. The interface module likewise needs to be provided in order to connect the control computer to the master unit, which interface module then conversely receives and pre-processes the control data and transmits the latter to the interface module in the remote unit via the existing connection. In this case, data can be interchanged, for example, using known and suitable networks such as LAN or Ethernet. Such a digital data network also makes it possible, for example, to allocate each remote unit its own address inside the network. The respective digital unit or the respective remote unit can then be directly addressed via this address. The information transmitted between two or more remote units and/or the master unit is also uniquely identified via the address.

For this purpose, the communication unit is preferably connected to the signal path for the purpose of coupling the information and control data to the communication signal. In other words, data interchange with regard to the information relating to the essential communication signals detected and with regard to the control data for the digital unit is applied to the signal transmitted between the remote units or to the signal transmitted to the master unit. A central control computer which is connected, in particular, to the master unit is then able to identify the transmitted data inside the digital data network and to divert said data to the desired remote units via the master unit. In the case of more complex switching tasks, the central driving of the digital units of the remote units can then also be transferred to this computer. For this purpose, the current status as well as further information relating to the type and rate of communication on essential communication channels can also be interrogated and displayed. However, the central control computer may also be part of the master unit itself which is then correspondingly intelligent.

In order to separate remaining communication signals from the essential communication signals to be separated, at least one analog filter unit for separating the frequency bands of incoming and outgoing analog essential communication signals is preferably included. Such an analog filter unit already makes it possible to mask, for example, the high frequencies of the communication signals of the mobile radio network. This also makes it possible to eliminate interference signals, in particular.

The stated object is also achieved, according to the invention, by means of an antenna distribution system having at least one master unit and a number of remote units which are connected to the master unit and are associated with an interface module of the type described above or are equipped with such an interface module, the master unit being designed to selectively drive the digital units of the remote units and to receive and forward the essential communication signals.

Further advantageous refinements of this are found in the subclaims which are directed to an antenna distribution system. The advantages mentioned for the interface module can be analogously applied to the antenna distribution system in this case. In order to achieve the objects mentioned, the master unit is preferably associated with a number of interface modules of the type described above which communicate with a number of allocated remote units or the interface modules of the latter.

A central control computer is preferably connected to one of the interface modules. Said computer may be externally arranged or may form part of the master unit. The control computer is designed to coordinate the distribution of the essential communication signals inside the distribution network, to evaluate the characteristic signal parameters and to drive the digital units in accordance with the signal parameters. This makes it possible to drive the remote units in an automated manner within certain limits. For example, the digital units may be driven to appropriately treat the essential communication signals rushing through, as far as the type of transmission method used is concerned. For example, essential communication can thereby be established using the simplex, duplex or semi-duplex method, depending on the essential communication signal received.

Means may likewise also already be provided in the master unit for the purpose of locating the mobile terminal transmitting the essential communication signals on the basis of the signal strengths and/or propagation time of the essential communication signals received from the remote units. However, this may likewise be allocated to the central control computer.

In order to establish communication between different essential communication bands, the central control computer is also preferably designed to drive the digital units for the purpose of frequency conversion between the frequency bands and/or a propagation time delay of essential communication signals.

Figure 1:
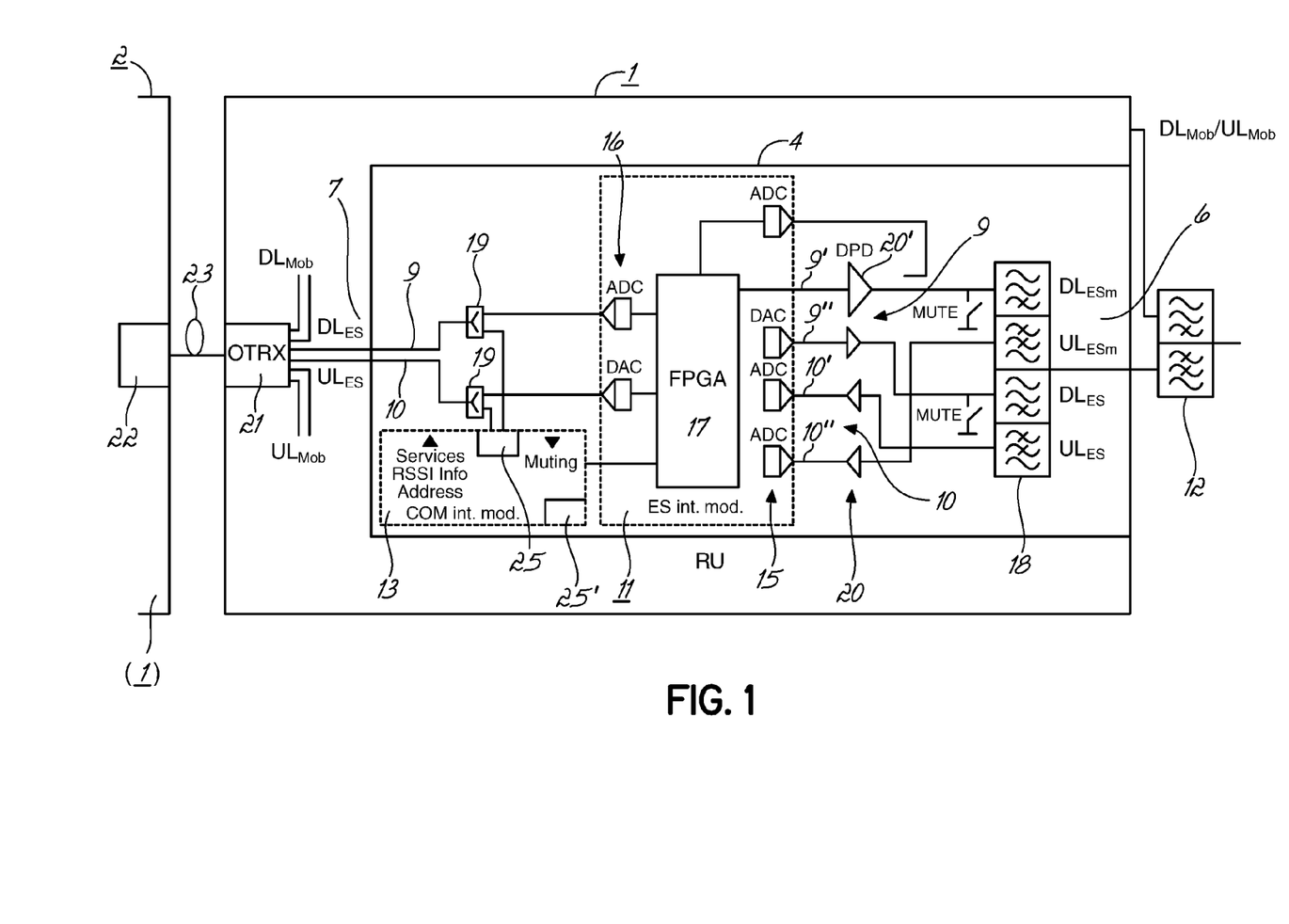
FIG. 1 schematically shows a remote unit having an interface module for transmitting essential communication signals.

FIG. 1 schematically illustrates a remote unit 1, as is part of an antenna distribution system of a mobile radio network. In this case, the remote unit 1 is used to enable radio communication between mobile terminals inside buildings, tunnels, vehicles, train stations, stadiums etc. and a base station arranged outside the given locality. A master unit 2 is provided in this case, which master unit is arranged in the vicinity of the given premises or locality and is connected to the base station. The master unit 2 is connected to a number of the remote units 1 illustrated via corresponding connecting lines (optical, electrical) or via radio. The remote units 1 transmit and receive communication signals and establish the actual radio link to the mobile terminals.

In addition to further units (not illustrated here) for ensuring communication between the master unit 2 and the mobile terminals inside the mobile radio network, the remote unit 1 comprises an interface module 4 which enables communication on essential communication channels to be incorporated in the existing radio network architecture.

For this purpose, the interface module 4 has a first interface 6 for analog data interchange with mobile terminals and a second interface 7 for analog and/or digital data interchange between the remote unit 1, the master unit 2 and further remote units. In other words, the remote unit 1 can be connected either to the master unit 2 or to further remote units 1 via the second interface 7. In the latter case, the remote units 1 are connected in series with one another or in star via corresponding splitters, for example. FIG. 1 indicates such a constellation by the reference symbol 1 in brackets. Between the two interfaces 6 and 7, the interface module 4 also comprises a signal path 9 in the downlink direction and a signal path 10 in the uplink direction. Signals received by the first analog interface 6 are passed, via the signal path 10, to the second interface 7 and, from there, are passed on to the master unit 2 or to one or more further remote units. Signals received by the master unit 2 or by one or more remote units at the second interface 7 are passed along the signal path 9 in the direction of the first analog interface 6 and, from there, are transmitted to mobile terminals by radio. In order to receive and transmit radio signals, the first analog interface 6 is connected to a corresponding antenna unit which is not graphically illustrated in the present case.

A digital unit 11 is incorporated in the downlink signal path 9 and in the uplink signal path 10, which digital unit primarily has the task of digitizing incoming communication signals, extracting essential communication signals therefrom or masking remaining communication signals, forwarding the essential communication signals and subjecting them to analog conversion again before transmission to the analog interfaces 6. Following conversion, the essential communication signals at the interface 7 can be forwarded to one or more remote units 1 or to the master unit 2 in an analog or digital manner.

A so-called analog crossband coupler 12 which separates communication channels of the mobile radio network from essential communication channels is connected upstream of the interface module 4. The crossband coupler 12 may be part of the remote unit 1 or the interface module 4. Since the mobile channels are widely separated from the essential channels, the demands imposed on the configuration of this analog filter are low.

The interface module 4 also has a communication unit 13 associated with the digital unit 11. The communication unit 13 is designed to further process data pre-processed by the digital unit 11, if necessary, and to supply said data to the master unit 2 or to further remote units via the second interface 7. The communication unit 13 is likewise designed to receive control data from the master unit 2 via the second interface 7 and to forward said control data to the digital unit 11 for the purpose of driving.

The digital unit 11 is decisively provided by a digital circuit 17 which, in the present case, is in the form of a programmable integrated circuit (FPGA=Field Programmable Gate Array). The functions to be performed for the purpose of pre-processing the digital data of the essential communication signals are implemented in this digital circuit 17 and can be retrieved in a controllable manner. Digital converter units 15 which transform incoming communication signals in the baseband are located both in the uplink signal path 10 and in the downlink signal path 9. According to the embodiment illustrated, further digital converter units 16 are arranged between the second interface 7 and the digital unit 11. These digital converter units 16 are required only when analog signals are intended to be transported inside the distribution system. The digital unit 11 is designed to identify the essential communication signals from the digitized communication signals, to further process said essential communication signals, if necessary, and to forward them in a corresponding manner in the uplink or downlink direction. The remaining communication signals are masked and are no longer taken into account any further by the interface module 4. The frequency and the transmission method of the essential communication signals are used to identify the latter. In particular, bands enabled for essential communication are arranged in a frequency space of below 700 MHz. Furthermore, the type of modulation of the communication signals received can be used for identification. For example, many essential communication signals are subjected to amplitude modulation in a simple manner. Frequency modulation is provided, if necessary. The type of clocking, a simplex, a duplex or a semi-duplex mode is also taken into account by the digital unit 11 and is used to identify the essential communication signals.

The essential communication signals digitally identified in the digital unit 11 can also be directly accepted and forwarded by the communication unit 13. For this purpose, said signals may also be modulated in order to increase the transmission rate; in particular, phase or QAM modulation may be carried out.

The first analog interface 6 is also associated with a pre-filter unit 18. This pre-filter unit 18 has the task of coarsely filtering the frequency bands of essential communication signals in the uplink and downlink directions. Depending on the transmission method, pre-filtering may be implemented as a filter in the frequency domain (FDD) or as a switch in the time domain (TDD). Since the bands of essential communication channels are still at a sufficient distance from one another, a moderate analog frequency filter suffices in the frequency domain. After pre-filtering, the interface module 4 operates with two separate transmission directions independently of the duplexing method. For this purpose, a separate signal path 9 is formed in the downlink direction and a separate signal path 10 is formed in the uplink direction, respectively. In this case, the number of downlink paths 9', 9" and uplink paths 10', 10" depends on the number of essential frequency bands and/or their duplexing methods which are intended to be supported. Two FDD bands are illustrated by way of example in the exemplary embodiment.

The essential communication signals within the pre-filtered frequency bands are analogously identified in an extremely complicated manner, as already stated. The channels allocated to essential communication sometimes have only a bandwidth in the kHz range. The digital unit 11 which takes into account the digitized communication signals therefore undertakes this actual identification.

A coupling-in unit or a coupling-out/in unit 19 is respectively implemented in the uplink signal path 10 and in the downlink signal path 9 between the first interface 6 and the digital unit 11. Via these coupling-in/out units 19, the communication unit 13, on the one hand, receives control data from the master unit 2 and, on the other hand, applies signal parameters from the digital unit 11 to the transmitted signal in the uplink direction. The digital baseband data can also be coupled in and out via the coupling-out/in unit 19. This is preferably effected via a higher-order digital modulation method, for example QAM.

In order to amplify the received signals and the signals to be transmitted, a number of amplifier units 20 are located between the digital unit 11 and the first analog interface 6. On account of the narrow bandwidth of the essential communication signals and since the latter are already in the form of digital baseband data, digital pre-distortion using a DPD amplifier 20' can be used to amplify the signal to be transmitted. This makes it possible to considerably reduce undesirable spurious transmissions, which takes into account the extremely high dynamic response requirements in adjacent bands.

The second interface 7 is associated with an electro-optical transducer 21 which is used to combine all of the signals in the uplink direction and to apply them to a common optical waveguide 23. The remote unit 1 is connected to the master unit 2 and optionally to further remote units via the optical waveguide 23. In order to separate the received signals, a corresponding electro-optical transducer 22 there converts incoming optical signals into corresponding electrical signals again. Conversely, electrical signals are converted into optical signals at the electro-optical transducer 22 of the master unit 2 in the downlink direction and are transmitted, via the optical waveguide 23, to the electro-optical transducer 21 of the remote unit 1 or further remote units. There, incoming optical signals are converted into corresponding electrical signals and are applied to the downlink signal path 9. The communication unit 13 obtains control data and possibly the digital baseband data for the digital unit 11 from said signals via the coupling-in/out unit 19. An interface 25 of a digital network, in particular Ethernet, is implemented for this purpose. Data are conversely also interchanged between the digital units 11 of different remote units and the master unit 2 via this interface 25.

The digital unit 11 and the communication unit 13 are designed to apply, in particular, signal strength and propagation time information, the type of the essential communication signal and an address of the corresponding remote units 1, 1', . . . to the common transmission signal and to transmit the latter to the master unit 2. Conversely, the communication unit 13 is designed to receive digital baseband data and control data from the master unit 2 and to drive the digital unit 11 in a corresponding manner. In this case, provision is made, for example, to drive the digital unit 11 to a time delay in the downlink direction in order to advantageously change negative interference effects when transmitting the essential communication signals via a plurality of remote units. The communication unit 13 can also be used to drive the digital unit 11 to switch the remote unit 1 to a direct communication mode. In this case, essential communication signals received from the first analog interface 6 are sent back to the same analog interface 6, in amplified form, if appropriate with a frequency offset or in a form converted into another communication technology, for retransmission. As a result, the correspondingly driven remote unit 1 becomes a relay station which improves radio communication on essential communication channels in situ and allows, in particular, communication to be set up between different units which use different essential transmission methods. Two interrupters are also connected downstream of the amplifiers 20 in the uplink direction. Said interrupters are driven by the communication unit and prevent noise from being transmitted during idling.

The communication unit 13 does not necessarily communicate via the second interface 7. In particular, communication with the communication unit 13 can also be effected via a direct digital interface 25' to a digital network such as Ethernet. A control computer may be directly connected to this interface. In other words, a local control center may be formed in situ by connection to the interface 25' in order to quickly obtain a control possibility via the different essential communication channels in the event of a disaster etc., the architecture of the existing mobile radio communication network being used.

In addition, communication with the master unit 2 can also be preferably effected via radio. On account of the low information density of the data to be transmitted, the second interface 7 may also be in the form of a radio interface to a WLAN network.

The mobile radio communication signals are separated from the essential signals at the crossband coupler 12. The mobile radio communication signals pass through the remote unit 1 actually intended for them without being influenced by the interface module 4. As indicated in FIG. 1, all transmission signals, that is to say those of the mobile network and those of the essential transmission channels, digital and analog signals may now be combined at the second interface 7 and can be forwarded to the master unit 2 or to further remote units via the common transmission line, the optical waveguide 23 in this case. Conversely, that is to say in the downlink direction, the corresponding incoming signals are then separated there. However, the interface module 4 may likewise be equipped with a separate second interface 7 via which only the digital and/or analog signals from the essential communication channels or from the communication unit 13 run.

The interface module 4 may be an integral part of the remote unit 1 or of a master unit 2. However, it may also be in the form of a separate additional module which is connected to the remote unit 1 or to the master unit 2 via the corresponding lines. In the present case, it is connected to the second interface 7 and to the crossband coupler 12.

Figure 2:
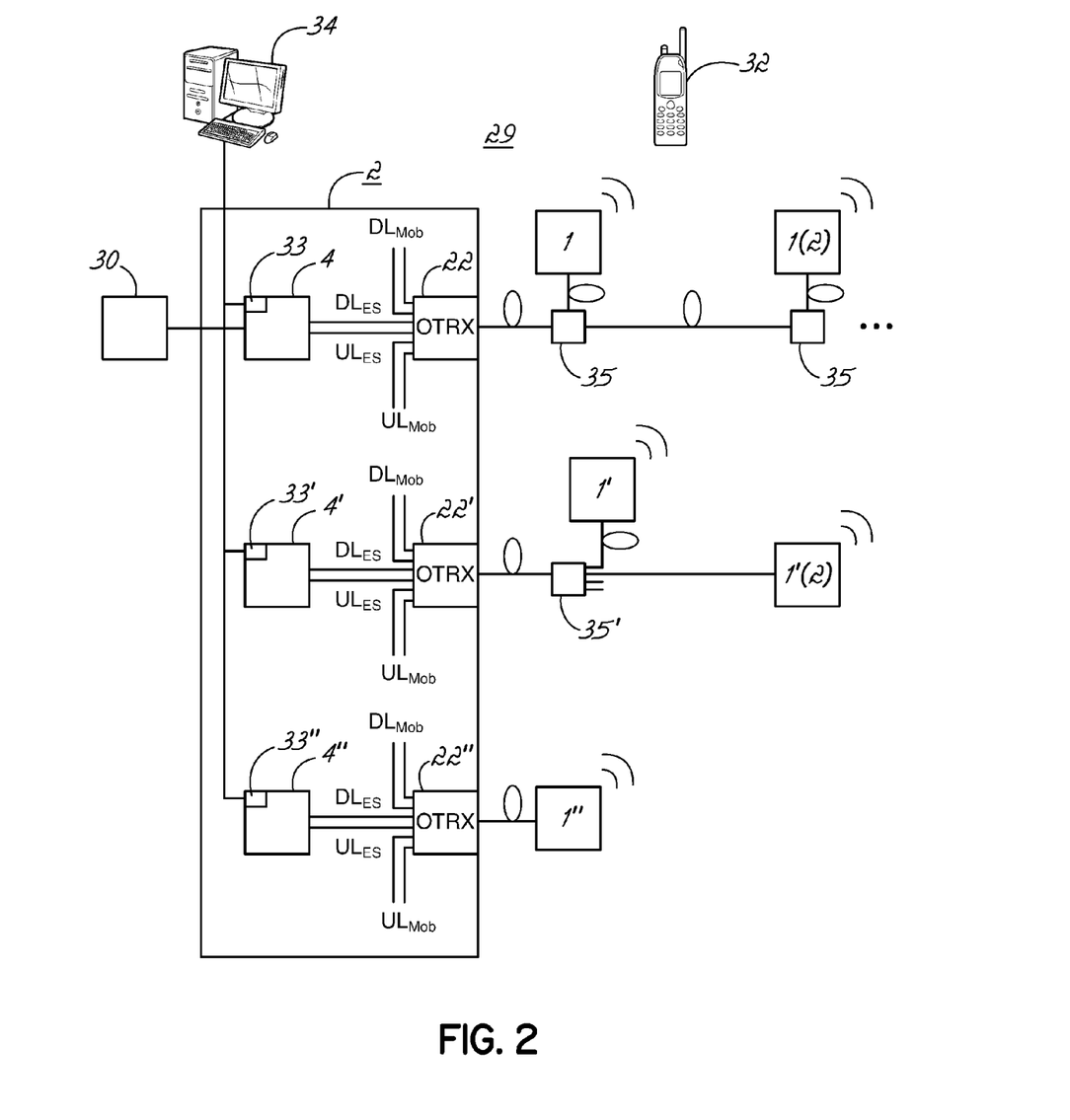
FIG. 2 shows an antenna distribution system having a number of remote units.

FIG. 2 schematically illustrates an antenna distribution system 29, as is used to set up communication inside closed rooms, tunnels, vehicles, stadiums or generally in a radio shadow. To this end, the antenna distribution system 29 comprises a base station 30 which is connected to a master unit 2 in a wired manner or by radio. The master unit 2 is arranged outside the given locality and interchanges data with remote units 1, 1', 1" arranged inside the locality. In this case, interchange is effected via a respective common optical waveguide. Inside the given locality, a mobile terminal 32 and the respective remote units 1, 1', 1" communicate by radio.

The master unit 2 has a plurality of electro-optical couplers 22, as already described with respect to FIG. 1, in order to connect remote units 1, 1', 1". Two remote units 1, 1(2) are connected in series, two remote units 1', 1'(2) are connected in star and one remote unit 1" on its own are connected to these electro-optical couplers 22 in FIG. 2 from the top down. All of the remote units 1, 1', 1" are connected to the master unit 2 via optical waveguides. Optical splitters 35 are respectively provided for the purpose of separating the signals from and to the individual remote units 1, 1', 1".

The antenna distribution system 29 shown makes it possible to set up radio communication of adequate quality in localities which are difficult to reach from the outside by radio. The remote units 1, 1', 1" shown in FIG. 2 are all equipped with an interface module 4 corresponding to FIG. 1. In this case, uplink communication is respectively effected via the second interface 7 at which all of the transmission signals are combined or separated and are jointly transmitted via an optical waveguide. Incoming communication signals are correspondingly separated in the electro-optical couplers 22 of the master unit 2. In particular, the communication signals of the mobile radio network are separated and are subjected to the conventional further processing, transmission, amplification, etc. The transmission signals of the respective interface modules 4 from the remote units 1, 1', 1" are separated. Corresponding interface modules 4, 4', 4" which are associated with the electro-optical couplers 22, 22', 22" and are constructed according to FIG. 1 are respectively provided in the master unit 2 for the purpose of further processing and forwarding these essential transmission signals. Communication with a central control computer 34 then takes place via respective local LAN interfaces 33, 33', 33" associated with the communication units 13. In this case, digital baseband data, including an IP address of the respective remote units 1, 1', 1", are interchanged, in particular. The control computer 34 may have a fixed network connection, in particular.

An antenna distribution system 29 configured in this manner makes it possible to use the advantages of a modern network architecture to transmit essential communication signals.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

LIST OF REFERENCE SYMBOLS

1 Remote unit
2 Master unit
4 Interface module
6 First analogue interface
7 Second analogue interface
9 Signal path
10 Signal path
11 Digital unit
12 Crossband coupler
13 Communication unit
15 Digital converter units
16 Digital converter units
17 Digital circuit (FPGA)
18 Pre-filter unit
19 Coupling-in/out unit
20 Amplifier unit
20' DPD amplifier
21 Electro-optical coupler
22 Electro-optical coupler
23 Optical waveguide
25 Interface
25' Interface
29 Antenna distribution system
30 Base station
32 Mobile terminal
33 Local LAN connection
34 Central control computer with/without a fixed network connection
35 Optical splitter

What is claimed is:

1. An interface module for a unit designed to transmit and/or amplify communication signals inside an antenna distribution system the interface module comprising:
a first analog interface for forwarding and receiving communication signals from mobile terminals;
a second interface for forwarding and receiving communication signals from the antenna distribution system;
at least one signal path for forwarding the received communication signals between the first and second interfaces;
a controllable digital unit which incorporates the signal path and digitizes incoming communication signals and subjects outgoing communication signals to analog conversion, the digital unit being configured to evaluate characteristic signal parameters of the communication signals and identify essential communication signals in the digitized communication signals from remaining communication signals, and further configured to mask the remaining communication signals and to forward the essential communication signals;
a communication unit configured to interchange information and control data between a master unit and the controllable digital unit for controlling operation of the digital unit.

2. The interface module according to claim 1,
the digital unit being configured to detect characteristic signal parameters of the essential communication signals identified and to forward said signal parameters.

3. The interface module according to claim 2,
the digital unit being configured to detect and forward, as characteristic signal parameters, at least one of the signal strength, the rate, the frequency band or the type of communication of the essential communication signals identified.

4. The interface module according to claim 1,
the digital unit being configured to digitize the communication signals in the baseband.

5. The interface module according to claim 1,
the digital unit being configured to at least one of delay or interrupt the forwarding of the essential communication signals in the direction of the first analog interface in a controllable manner.

6. The interface module according to claim 1,
the digital unit being configured to interrupt the forwarding of the essential communication signals in the direction of the second interface in a controllable manner.

7. The interface module according to claim 1,
the digital unit being configured to feed incoming essential communication signals back to the first analog interface.

8. The interface module according to claim 1,
the digital unit being configured for controllable frequency conversion between the frequency bands of essential communication signals.

9. The interface module according to claim 1,
the communication unit comprising an interface for a digital data network in order to interchange the information and control data.

10. The interface module according to claim 1,
the communication unit being connected to the signal path for the purpose of coupling the information and control data to the communication signal.

11. The interface module according to claim 1, further including at least one analog filter unit for separating the frequency bands of incoming and outgoing analog essential communication signals.

12. An antenna distribution system having at least one master unit and a number of remote units which are connected to the master unit and are associated with an interface module according to claim 1, the master unit being configured to selectively drive the digital units of the remote units and to receive and forward the essential communication signals.

13. The antenna distribution system according to claim 12,
the master unit being equipped with a plurality of interface modules according to claim 1.

14. The antenna distribution system according to claim 12, further including a control computer which is configured to receive and evaluate the characteristic signal parameters of the essential communication signals and to drive the digital units in accordance with the signal parameters being connected to one of the interface modules.

15. The antenna distribution system according to claim 14,
the control computer being configured to locate the mobile terminal transmitting the essential communication signals on the basis of at least one of the signal strengths or propagation time of the essential communication signals received from the remote units.

16. The antenna distribution system according to claim 14, the control computer being configured to drive the digital units for the purpose of frequency conversion between at least one of the frequency bands or a propagation time delay of essential communication signals.

* * * * *